United States Patent
Toyoda et al.

(10) Patent No.: US 6,795,398 B1
(45) Date of Patent: Sep. 21, 2004

(54) ATM CELL MULTIPLEXER

(75) Inventors: Yoshimi Toyoda, Osaka (JP); Kenji Miura, Osaka (JP); Takashi Monzawa, Osaka (JP); Tamotsu Matsuo, Osaka (JP); Jun Asato, Osaka (JP); Hideki Shiono, Osaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/535,839

(22) Filed: Mar. 28, 2000

(30) Foreign Application Priority Data

Aug. 30, 1999 (JP) .......................................... 11-243742

(51) Int. Cl.⁷ .......................... H04L 12/56; H04Q 11/04
(52) U.S. Cl. ..................... 370/231; 370/394; 370/395.1
(58) Field of Search ............................. 370/230, 230.1, 370/231, 232, 235, 389, 392, 393, 394, 395.1, 395.7, 400, 401, 419, 428, 465, 469; 709/213, 215, 238, 240; 710/20, 29, 36, 40, 52; 711/147, 148, 150, 151

(56) References Cited

U.S. PATENT DOCUMENTS

| | | | | |
|---|---|---|---|---|
| 5,402,426 A | * | 3/1995 | Foglar et al. | 370/232 |
| 5,570,368 A | * | 10/1996 | Murakami et al. | 370/395.1 |
| 5,649,217 A | * | 7/1997 | Yamanaka et al. | 395/872 |
| 5,768,274 A | * | 6/1998 | Murakami et al. | 370/395.1 |
| 5,838,677 A | * | 11/1998 | Kozaki et al. | 370/389 |
| 5,838,680 A | * | 11/1998 | Noiri et al. | 370/395.7 |
| 6,031,838 A | * | 2/2000 | Okabe et al. | 370/395.1 |
| 6,122,717 A | * | 9/2000 | Chan et al. | 711/170 |
| 6,188,693 B1 | * | 2/2001 | Murakami | 370/395.1 |

FOREIGN PATENT DOCUMENTS

EP         0707430 A2    12/1995

* cited by examiner

*Primary Examiner*—Alpus H. Hsu
(74) *Attorney, Agent, or Firm*—Katten Muchin Zavis Rosenman

(57) ABSTRACT

In an ATM cell multiplexer which multiplexes ATM cells outputted from a plurality of cards, sequential cell arrival numbers common to the ATM cells outputted from a plurality of cards are added to each of the cells to be written in memories, and the read side checks a sequentiality of the cell arrival numbers whereby the ATM cells are read in the order of arrival and the cell arrival number at that time is used as the cell arrival number to be checked at the next read time. Also, when any of the cards is pulled out, a card not pulled out is operated normally and an address counter of only the pulled-out card is cleared. Even when non-sequentiality of the cell arrival numbers occurs due to the clearance of the address counter, the maximum cell arrival number is set to the value which enables the oldest cells to be read first. Furthermore, by the division of storing memories according to priority degrees, a read control identifying the ATM cells for a real time system as well as the ATM cells for a data system can be performed.

9 Claims, 11 Drawing Sheets

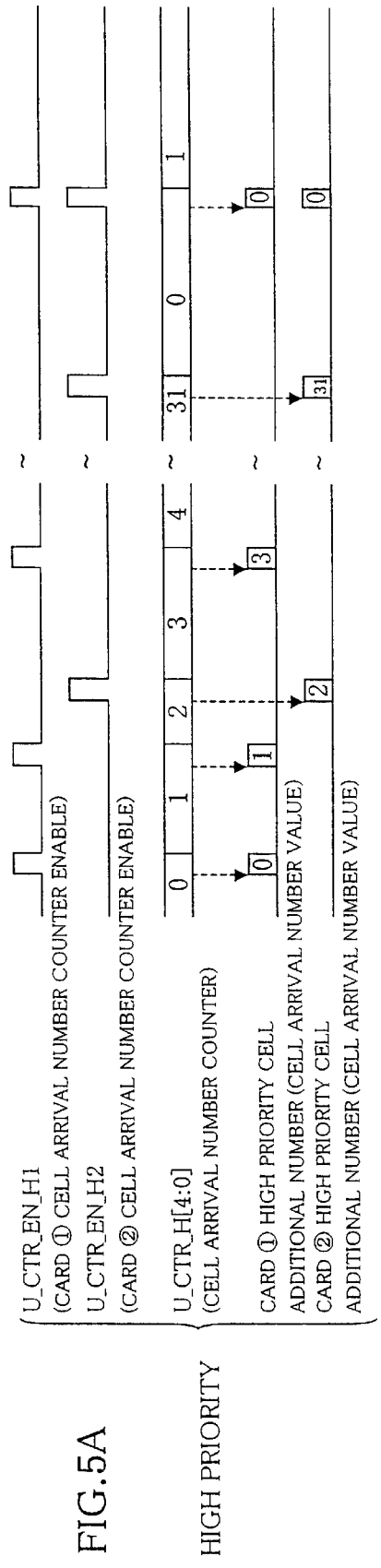
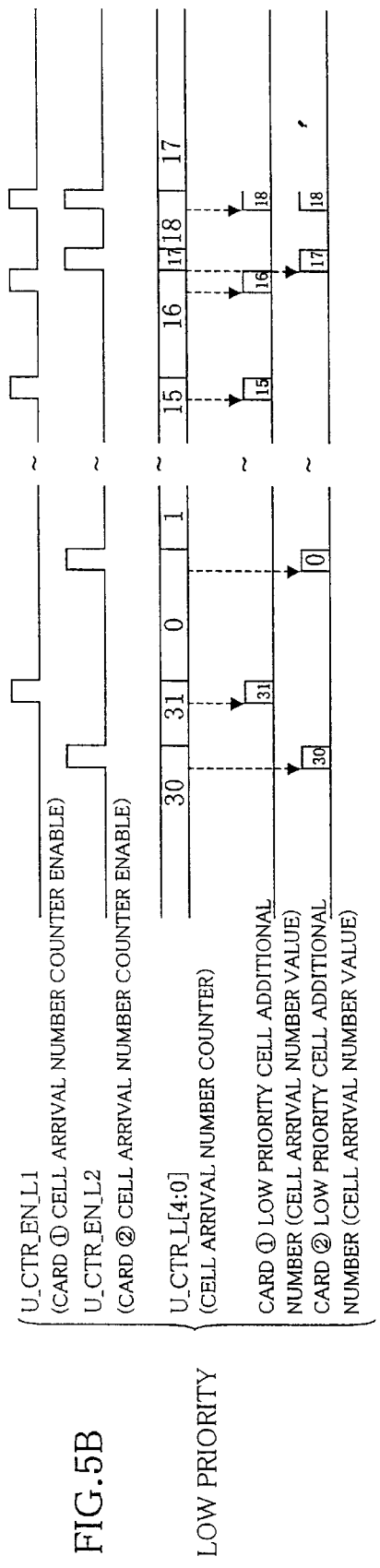
FIG.5A HIGH PRIORITY
FIG.5B LOW PRIORITY

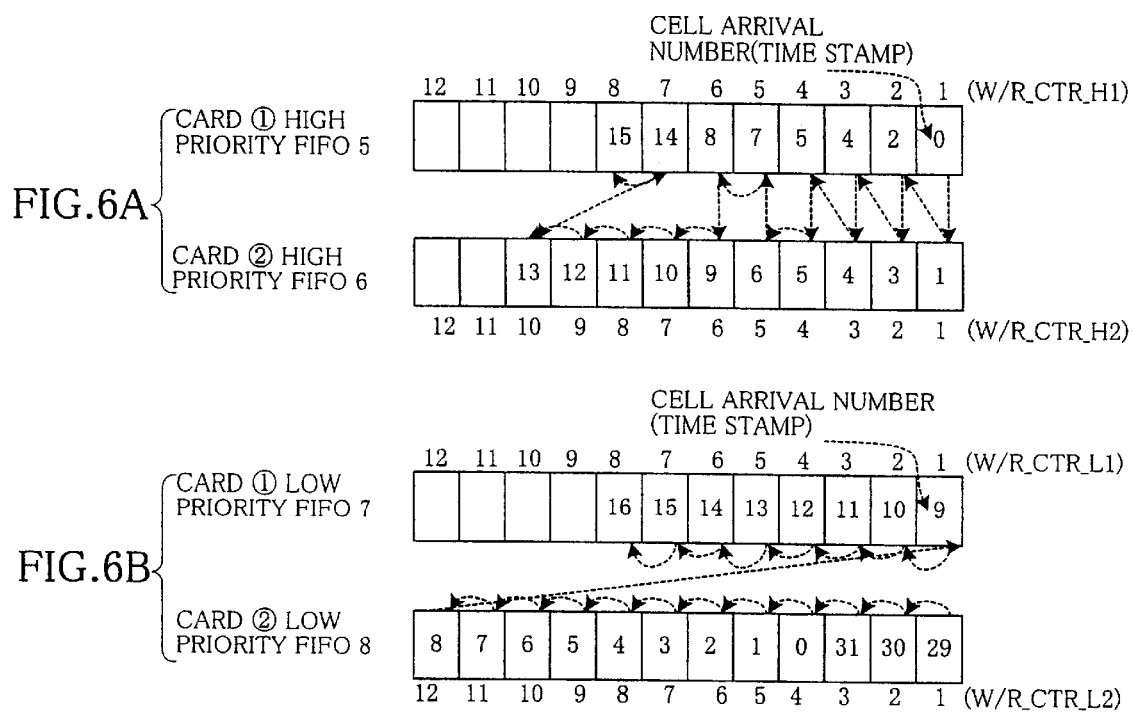

ATM CELL MULTIPLEXER

BACKGROUND OF THE INVENTION

1. Field of the Invention

The present invention relates to an ATM cell multiplexer, and in particular to an ATM cell multiplexer operated on ATM-PON (Asynchronous Transfer Mode-Passive Optical Network) layer.

In a construction of an optical access network represented by the FTTH (Fiber to the Home) for realizing a high informative communication service, the ATM-PON technique has been indispensable as a means for realizing a large capacity of data communication.

In this case, a technique is required which multiplexes an ATM cell from a subscriber and performs a mapping on the ATM-PON layer to the ATM cell as a data cell.

2. Description of the Related Art

FIG. 12 shows an optical subscriber interface or an optical network unit ONU which multiplexes an ATM cell and performs a mapping on the ATM-PON layer to the ATM cell as a data cell, as mentioned above.

In order to transfer the ATM cell from a subscriber to a subscriber terminal equipment or an optical line terminal (OLT), the optical subscriber interface ONU is provided with an ATM cell multiplexer 11, an up data assembly portion 12, and a down delay take-in portion 14.

Data taken in at the take-in portion 14 are further outputted to cards ① and ② attached outside, and input data from the cards ① and ② are multiplexed at the ATM cell multiplexer 11.

The data cell multiplexed at the ATM cell multiplexer 11 are outputted to the subscriber terminal equipment as up data at a timing adjusted at a delay adjuster 13 in the up data assembly portion 12, subject to a delay adjustment value designated by the take-in portion 14.

In a prior art example of the ATM cell multiplexer as shown in FIG. 12, when there are two cards, each of which has an FIFO composed of two RAM's, and the cells are accumulated in both FIFO's, a "skip polling" operation by which the ATM cells are alternately read from the FIFO's has been performed.

Since the skip polling operation is performed to the FIFO's of both cards ① and ② when the ATM cells are read in such a conventional ATM cell multiplexer, the write/read processing of FIFO is performed preferentially to the cells arrived earlier in each of the cards. However, in both cards the cells are not always read in the order in which the cells have been written in the FIFO's due to the read timing of the ATM-PON layer and the like. Therefore, it has been disadvantageous that the oldest cell is not always read first.

Also when the ATM cells in the FIFO corresponding to a single card are almost fully occupied, it takes time to write the ATM cell, so that there has been a problem that the maximum waiting time is elongated when the mapping on the ATM-PON layer to the ATM cell is performed.

Furthermore, since no priority degree of the ATM cell from the card is identified, services of data system for data and the like and real time system for telephone and the like can not be separated when they exist together in a single card, so that there has been a problem that only the ATM cells of the real time system can not be preferentially transferred.

Moreover, the card may be pulled out during the operation. In this case, there has been a problem that an unnecessary ATM cell is to be read from the FIFO corresponding to the card pulled out with the inserted card being kept as it is.

SUMMARY OF THE INVENTION

It is accordingly an object of the present invention to provide an ATM cell multiplexer which multiplexes ATM cells outputted from a plurality of cards and which preferentially transfers the oldest ATM cell with a less waiting time.

In order to achieve the above-mentioned object, an ATM cell multiplexer including a plurality of memories connected to the cards, write processors which add sequential cell arrival numbers common to each of the cards to the ATM cells to be written in the memories, and a read processor which reads the cell arrival numbers from the memories to check a sequentiality thereof, thereby reading the ATM cells from the cards in an order of the cell arrival numbers, and which makes the cell arrival numbers at that time the cell arrival numbers to be checked at a next read time.

Namely when the ATM cells from the cards are written in the corresponding memories, the write processors sequentially add the cell arrival numbers to the ATM cells to be written in the memories with the added cell arrival numbers. The cell arrival numbers are sequential numbers common to each of the cards.

The read processor reads only each of the cell arrival numbers added to the ATM cells. By comparing this with the cell arrival number previously read, the read processor reads the ATM cell which has the cell arrival number sequential to that previously read since it is the next ATM cell to be read, so that the cell arrival number of the ATM cell is made the cell arrival number to be checked at the next read time.

Thus, even if there are a plurality of cards, it becomes possible to process a read order of the ATM cells in the order of arrival by using the sequentiality of the cell arrival numbers.

In the ATM cell multiplexer when detecting that the ATM cells from the cards have simultaneously arrived, the write processors may add identical cell arrival numbers to the ATM cells to be written in the memories, and the read processor may preferentially read the ATM cells of a predetermined card from a corresponding memory.

Namely when the ATM cells have simultaneously arrived from the cards, the write processors add common and identical cell arrival numbers to the ATM cells. When reading the cell arrival numbers added to the ATM cells, the read processor preferentially reads from a memory corresponding to a predetermined card. Thus, it becomes possible to realize a skip polling to every memory.

In the ATM cell multiplexer the memories may be divided into a number corresponding to a priority degree, the write processors may detect the priority degree preliminarily added to the ATM cells and add the cell arrival numbers to the ATM cells according to the priority degree to be written in the corresponding memories, and the read processor may read the ATM cells in the order of the cell arrival numbers from the ATM cells in the memory whose priority degree is high.

Namely when a priority identification bit or the like indicating the priority degree is added to the ATM cell, the priority degree of the ATM cell is identified by the identification bit, and is classified into e.g. a high priority for the real time system and a low priority for the data system. By writing the ATM cell in the memories corresponding to the cards according to the priority degree, the cell arrival numbers are independently set according to the priority degree.

The read processor confirms whether or not there are written cells in the memory whose priority degree is high. If so, then the ATM cells are read according to the above-mentioned cell arrival numbers. If not so, then the ATM cells are read from the memory whose priority degree is low. Also in this case, the ATM cells are read according to the cell arrival numbers.

Thus, while there are ATM cells with the high priority degree left in the memory, reading them from the memory is continued. When there is no ATM cell with the high priority degree left, the ATM cells with the low priority degree are read. Thus, it becomes possible to earlier read the ATM cells with the high priority degree without being influenced by the ATM cells with the low priority degree.

In the ATM cell multiplexer the write processors may have an address counter at a time of writing the ATM cells in the memories, and make the corresponding address counter count up and notify the count value to the read processor when the ATM cells are written in the memories, and the read processor may have an address counter at a time of reading corresponding to the former address counter, and make the corresponding address counter count up and determine whether or not the ATM cells exist in the memories depending on a presence or absence of a difference between the count value notified from the write processor and the count value of the address counter of the read processor when the ATM cells are read from the memories.

Namely in order to determine whether or not the ATM cells are stored in the memories, the write processors and the read processor are provided with the address counters for the memories used at the time of writing/reading the ATM cells.

When writing the ATM cell in the memory, the write processor counts up the address counter, and when performing the read processing, the read processor counts up the address counter. By comparing the count values (cell count values) of both address counters, it is made possible to determine that there is an ATM cell left in the memory when the values are not coincident with each other.

In the ATM cell multiplexer when receiving a signal indicating that any of the cards is pulled out, the write processors and the read processor may clear the address counters of the memories corresponding to the cards to inhibit the writing.

Namely when the card is pulled out in the operation, only the address counter of the memory corresponding to the card pulled out is cleared and the writing is inhibited.

Accordingly, the count value of the address counter of the memory at the write processor and that of the memory at the read processor are reset when the card is pulled out, and the both values becomes "0" so that it is determined that there is no cell accumulation in the memory. Thus, an unnecessary reading can be avoided.

In the ATM cell multiplexer the write processors may have a counter which counts the cell arrival number, and the counter may have a count value equal to or more than a maximum number of the ATM cells to be written in the memories×the number of the card according to the priority degree+2.

Namely when the address counter of the memory is cleared as above, the ATM cells written in the concerned memory are substantially lost.

With this loss, the cell arrival numbers added to the ATM cells are also lost, so that when the card pulled out is again inserted, the sequentiality of the cell arrival numbers can not be recognized.

On the other hand, when the memory is fully occupied and the card is pulled out, the number of ATM cells lost corresponds to the number of cell numbers for the capacity of the memory (for the number of the addresses in the memory). If the cell arrival number is smaller than the capacity of the memory (the number of cells when the memory is fully occupied)×2+2, the counter which counts the cell arrival number on the write side may have counted round when the cell arrival number is not sequential, so that it is impossible to recognize the closest value.

For this reason, the counter which counts the cell arrival number can count a value equal to or more than the capacity of the memory (the number of the cells when the memory is full)×2+2. When the sequentiality of the cell arrival number is not detected, the ATM cell with the closest number to the cell arrival number previously read can be read, so that it becomes possible to firstly read the oldest cell regardless of the non-sequentiality of the cell arrival number when the card is pulled out.

In the ATM cell multiplexer the read processor may hold the cell arrival number of the read ATM cell as a latest value to be compared with the cell arrival number added to the ATM cells, firstly read the ATM cell coincident with an initial value of the latest value, and then read the ATM cell coincident with the value which is the latest value incremented by "1" from the memories.

Thus, the cell arrival number added to the ATM cell at the write processor and the latest cell arrival number held at the read processor are mutually different by "1", so that it becomes possible to sequentially read the ATM cells by checking the sequentiality.

In the ATM cell multiplexer when there is found no coincident ATM cell, the read processor may check which of the latest value and the cell arrival number of the ATM cells is older, and may preferentially read the ATM cell with a smaller cell arrival number.

Namely when the ATM cell with no sequentiality is detected, by preferentially reading the ATM cell with a smaller cell arrival number, it becomes possible to always read the oldest ATM cell firstly even when the card is pulled out.

In the ATM cell multiplexer a mapping on an ATM-PON layer may be performed to the ATM cells.

BRIEF DESCRIPTION OF THE DRAWINGS

FIGS. 5A and 5B are time charts showing an operation of a cell arrival number adding portion used for an ATM cell multiplexer according to the present invention;

FIGS. 6A and 6B are diagrams showing an example of a read order in the order of arrival of an FIFO memory in an ATM cell multiplexer according to the present invention;

Throughout the figures, like reference numerals indicate like or corresponding components.

DESCRIPTION OF THE EMBODIMENTS

Figure 1:
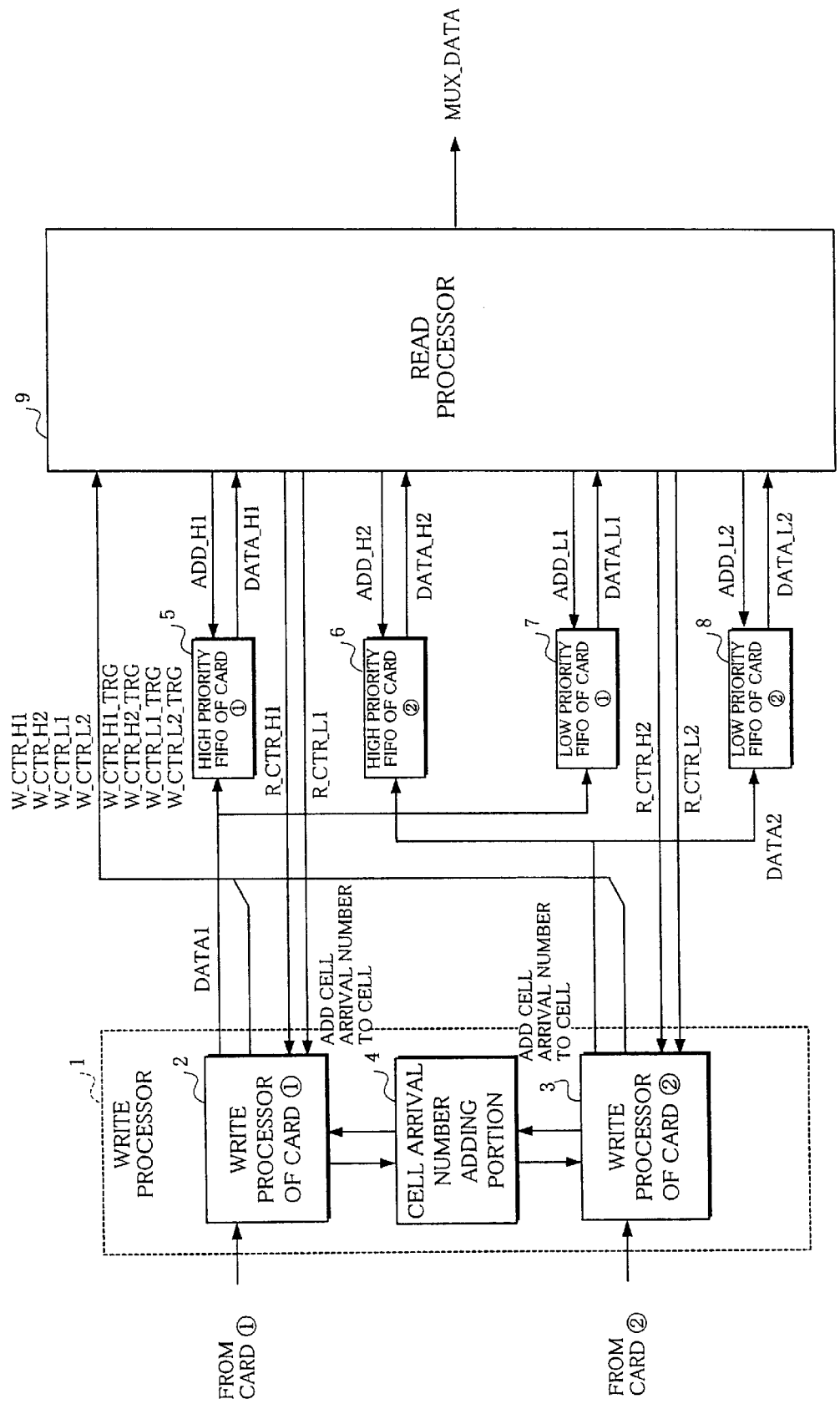
FIG. 1 is a block diagram showing an embodiment of an ATM cell multiplexer according to the present invention.

FIG. 1 shows an embodiment of an ATM cell multiplexer according to the present invention. While in this embodiment, two cards ① and ② are provided, the present invention is not limited to this number of the cards.

In FIG. 1, a write processor 1 is composed of a write processor 2 connected to the card ① for inputting output data of the card ①, a write processor 3 connected to the card ② for inputting output data of the card ②, and a cell arrival number adding portion 4 commonly connected to the write processors 2 and 3 for adding a cell arrival number.

Also this embodiment uses a high priority and a low priority as a priority degree. For this reason, FIFO's 5 and 6 which are RAM memories of the high priority are provided respectively for the cards ① and ②, and FIFO's 7 and 8 are similarly provided respectively for the cards ① and ② as memories of the low priority.

The FIFO's 5 and 7 are connected so as to write data DATA 1 of the card ① from the write processor 2 according to the priority degree, while the FIFO's 6 and 8 are similarly connected so as to write data DATA 2 of the card ② from the write processor 3 according to the priority degree.

A read processor 9 inputs count values, which will be hereinafter occasionally referred to as address counter or counter itself, W_CTR_H1, W_CTR_H2, W_CTR_L1, and W_CTR_L2 of address counters from the write processors 2 and 3 as well as counter trigger signals W_CTR_H1_TRG, W_CTR_H2_TRG, W_CTR_L1_TRG, and W_CTR_L2_TRG.

It is to be noted that in the following description and figures, e.g. "H/L" indicates the high priority/low priority, and "H1/L1" indicates the high priority/low priority for the card ① (hereinafter simply referred to as "card ①-high priority/low priority).

In addition, the read processor 9 provides count values R_CTR_H1 and R_CTR_L1 of the address counters (not shown) in the read processor 9 to the write processor 2, and similarly provides count values R_CTR_H2 and R_CTR_L2 of the address counters to the write processor 3.

Furthermore, the read processor 9 reads data (ATM data cell) DATA_H1 by providing an address ADD_H1 to the FIFO 5, data DATA_H2 by providing an address ADD_H2 to the FIFO 6, data DATA_L1 by providing an address ADD_L1 to the FIFO 7, and data DATA_L2 by providing an address ADD_L2 to the FIFO 8.

Figure 2:
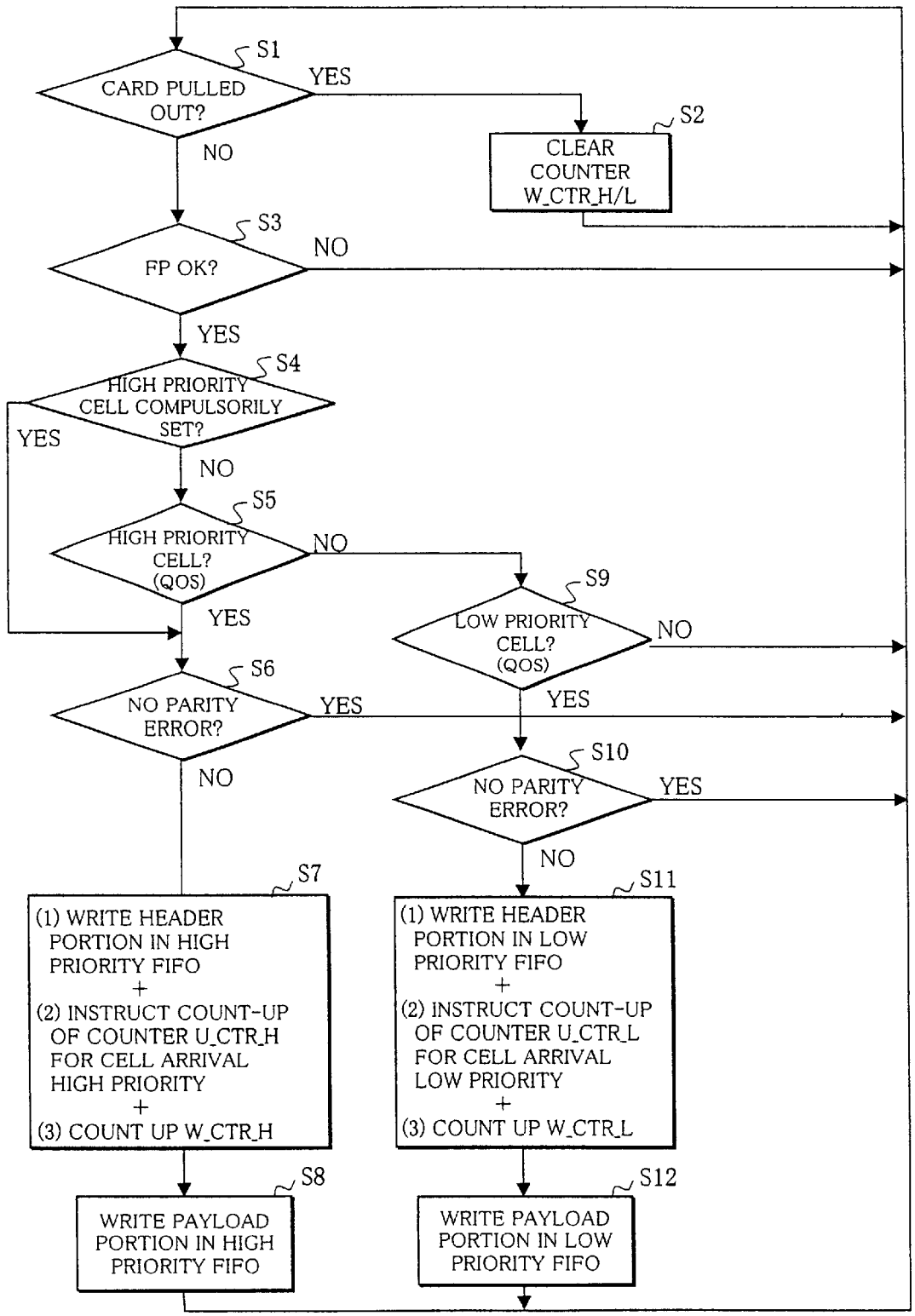
FIG. 2 is a flow chart showing an operation of a write processor (for a single card) used for an ATM cell multiplexer according to the present invention.

The operation of this embodiment of the ATM cell multiplexer according to the present invention will be firstly described by referring to an operation flow chart shown in FIG. 2 and time charts shown in FIGS. 3–6. It is to be noted that while the flow chart of FIG. 2 shows either the write processor 2 or 3, the following description takes the write processor 2 for the card ① as an example.

First of all, the write processor 2 determines whether or not the card ① is pulled out (at step S1). This can be determined by monitoring whether or not a card pulled-out signal CARD, which is not shown in FIG. 1 but shown in FIG. 3, comes from the card ①. When a card pulled-out state is found, the address counter W_CTR_H/L of the FIFO 5 or 7 on the card ① is cleared (at step S2).

Figure 3:
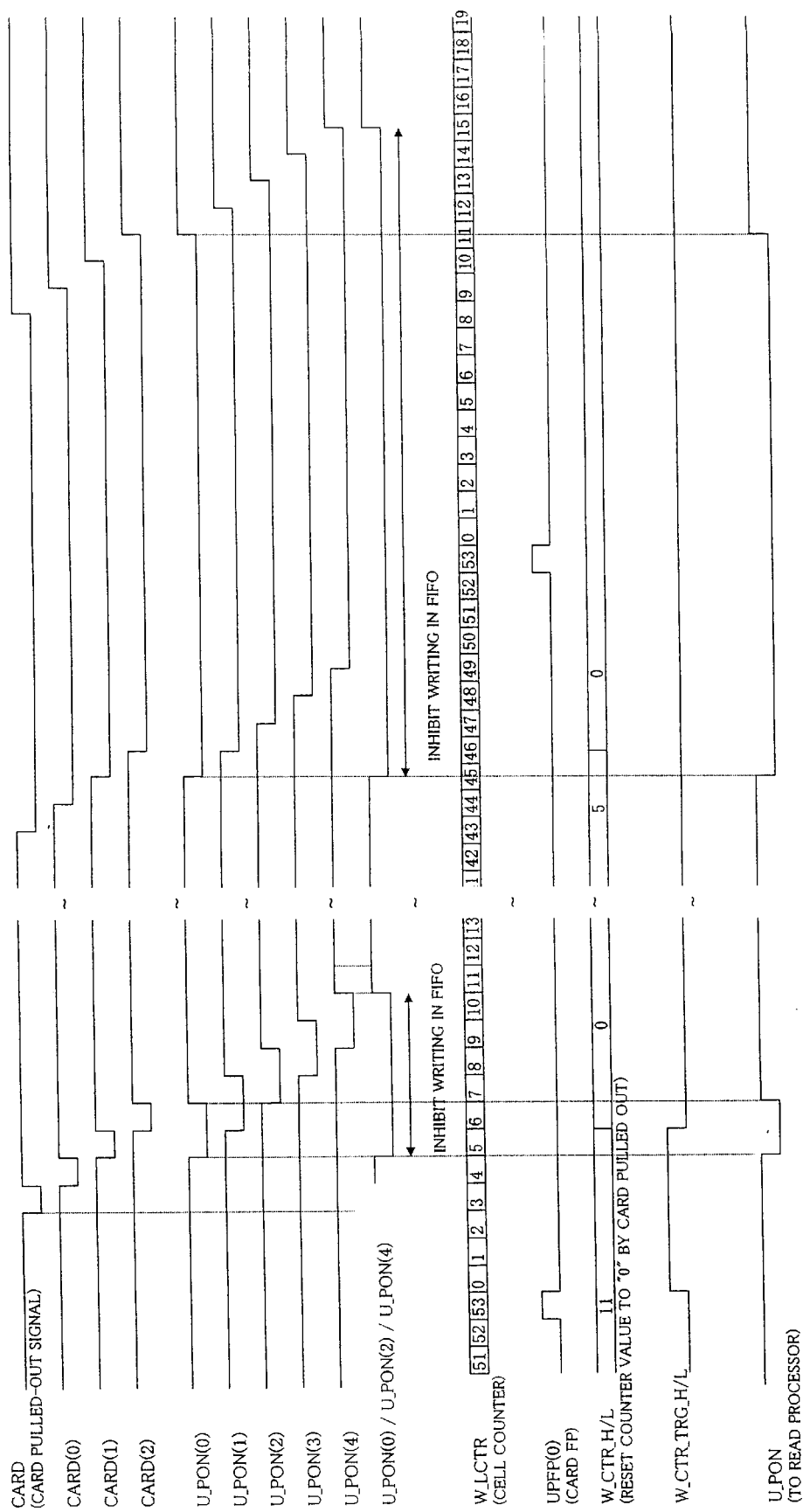
FIG. 3 is a time chart showing an operation of a write processor when a card is pulled out, used for an ATM cell multiplexer according to the present invention.

It is to be noted that in FIG. 3 the card pulled-out signal CARD is shifted over three stages and a signal U_PON, which is a signal obtained by dividing the frequency of the card pulled-out signal, is shifted over some stages (four-stage shift in this example) whereby the FIFO's 5 and 7 are cleared and a period for which writing in the FIFO's 5 and 7 is inhibited can be simultaneously set. While two examples of a write inhibition period are shown in FIG. 3, it can be variously determined depending on a processing rate of the memory and the like.

Also, a reset state (value "0") of the counter W_CTR_H/L for the FIFO's 5 and 7 in the write processor 2 is transmitted together with the signal U_PON to the read processor 9 by the trigger signal W_CTR_H/L_TRG as shown in the figure.

Figure 4:
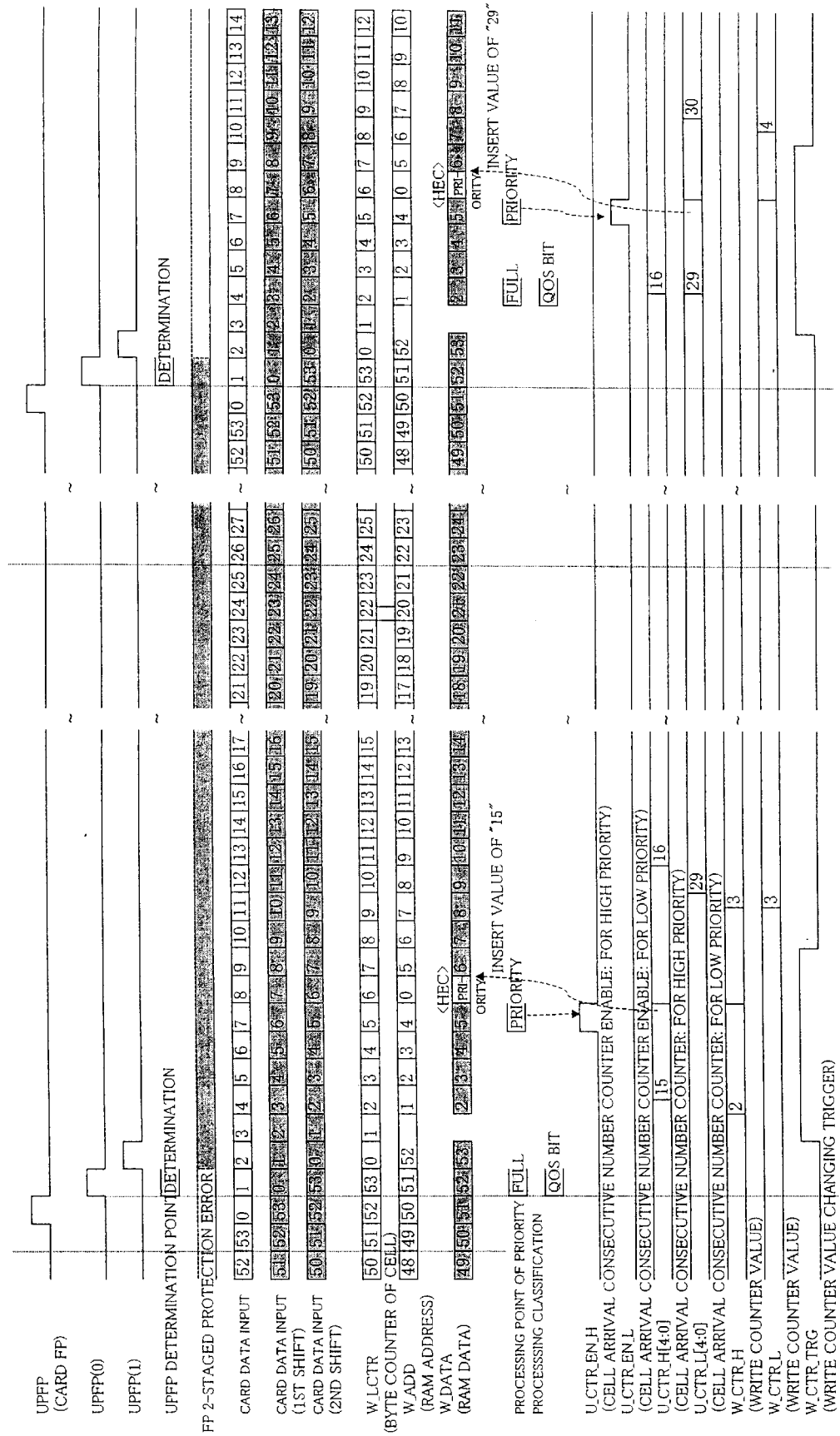
FIG. 4 is a time chart showing an operation of a write processor used for an ATM cell multiplexer according to the present invention.

When it is found that the card ① is not pulled out, a frame pulse is checked next (at step S3). This is determined by monitoring a signal UPFP from the card ① as shown in FIG. 4 and by providing a two-stage protection.

It is then determined whether or not a high priority cell is compulsorily set (at step S4). This can be compulsorily set by a pin attached outside and the like such that all of the data from e.g. the card ① are regarded as the high priority cells. In this case, the process proceeds to step S6. When it is not compulsorily set, the process proceeds to step S5.

It is determined at step S5 whether or not the data from the card ① is the high priority cell. This is determined by a QOS bit (bit identifying a service quality) in the ATM cell, or by watching "0" byte of the cell as a determination point in the state of 1st shift when the two-staged shift is performed to the data inputted from the card ①, as shown in FIG. 4.

As a result, if the data are found to be the high priority cell, the presence or absence of a parity error is further determined (at step S6). If there is no parity error, the process of step S7 is executed as follows:

(1) A header portion is written in the high priority FIFO 5. This indicates that an RAM data portion across the 2nd–5th bytes shown in FIG. 4 is written in the FIFO 5.

(2) The count-up of a counter U_CTR_H/L for a cell arrival-high priority is instructed. This is a processing that the write processor 2 instructs the cell arrival number adding portion 4 to count up the counter for adding the cell arrival number, which will be described by referring to the time charts of FIGS. 5 and 6.

The cell arrival number adding portion 4 is provided with a counter U_CTR_H for the high priority and a counter U_CTR_L for the low priority. As shown in FIG. 4, when the priority classification determined by the QOS bit is found to be e.g. the high priority, the write processor 2 provides the cell arrival number adding portion 4 with a counter enable signal U_CTR_EN_H1 or U_CTR_EN_H2 for the high priority, so that the counter U_CTR_H is counted up according to the card ① or ② as shown in FIG. 5A.

In this embodiment, the cell arrival number counter U_CTR_H/L is set to take count values "0–31" as one example of the above-mentioned "the capacity of the memory×the number of the cards+2", which will be described later.

According to the card ① or ②, the arrival numbers of the high priority cell are distributed as shown in FIG. 5A.

This state is indicated more simply in FIG. 6A, where twelve cell arrival numbers are to be added to the ATM cells in the high priority FIFO 5 for the card ①. The first cell arrival number (time stamp) "0" is added to the cell of the address count "1" in the FIFO 5 for the card ①, since the cell which has next arrived comes from the card ②, the cell arrival number is added to the position of the address count "1" in the FIFO 6.

Likewise, the example in which the 15th cell is added to the position of the address count "8" in the FIFO 5 for the card ① is applied to the final cell.

It is to be noted that FIGS. 5 and 6 also show the case where the ATM cells from the cards ① and ② simultaneously arrive. In this case, as shown in FIGS. 5 and 6, an identical cell arrival number is commonly assigned to the FIFO's 5 and 6 e.g. for the high priority cell.

Thus, the cell arrival number is added to an HEC portion which corresponds to the point of "0" byte between the 5th byte and the 6th byte in the RAM data shown in FIG. 4. The example of FIG. 4 shows that the value "15" of the cell arrival number counter U_CTR_H for the high priority is inserted.

(3) A cell write address counter W_CTR_H/L is counted up. As shown in FIGS. 5 and 6, every time the high priority cell is written in e.g. the FIFO 5, the counter W_CTR_H is counted up. When the last 15th ATM cell is stored in the FIFO 5 in the example of FIG. 6A, the count value becomes "8".

This state is also shown in FIG. 4 as mentioned above, where the write address counter W_CTR_H is counted up from "2" to "3" after the occurrence of a counter enable signal U_CTR_EN_H. Such a count value is notified to the read processor 9 by the trigger signal W_CTR_TRG.

After the execution of step S7 in this way, a payload portion is written in the FIFO 5 at step S8. Namely, since the cell arrival number is inserted into the HEC byte portion indicating the priority degree in the RAM data shown in FIG. 4, it becomes unnecessary to indicate the priority degree in the ATM cell data by writing the payload portion except the HEC byte portion and the above-mentioned header portion in the FIFO 5, so that the cell data are to be written in the FIFO 5 with only the cell arrival number being inserted.

When the process returns to step S5, at which it is found that the ATM cell is not the high priority cell, whether or not it is the low priority cell is further determined (at step S9). When it is found to be the low priority cell from the QOS bit, the same process as the high priority cell is executed (at steps S10–S12).

The processing for the low priority cell is shown in the right side of FIG. 4, where the cell arrival number "29" is inserted into the HEC byte portion. Also, an addition processing of the cell arrival number for the low priority is shown in FIG. 5B. As a result, as shown in FIG. 6B, the ATM cells written in the FIFO's 7 and 8 for the low priority with respect to the cards ① and ② and the address counters W_CTR_L1/L2 are provided.

Then, the operation of the read processor 9 shown in FIG. 1 will be described by referring to the flow charts shown in FIGS. 7 and 8 and the time charts shown in FIGS. 9–11.

The read processor 9 determines whether or not the card ① is pulled out by receiving the signal U_PON shown in FIG. 3 from the write processor 2 (at step S21). When it is found that the card is pulled out, as shown by signals U_PON and U_PON_FLAG of FIG. 11, a read address counter R_CTR_H1/L1 provided to the read processor 9 is cleared (at step S22).

Similarly, when it is found that the card ② is pulled out (at step S23), a read address counter R_CTR_H2/L2 is cleared (at step S24).

Then, the read processor 9 determines whether or not a read request exists (at step S25). This is designated by down data (position "49" of a frame counter) from a subscriber terminal equipment (OLT) as shown in FIG. 9. When the read request exists, whether or not the high priority FIFO cell exists is determined (at step S26).

This step can be performed in the same way as the next step S23 in which whether or not the high priority cell for the cards ① and ② exists is determined.

Namely, the high priority cell is written in the FIFO's 5 and 6 as shown in FIGS. 1 and 6A, and whether or not the high priority cell is written in this way is determined by comparing the write address counter W_CTR_H1/H2 at the write processors 2 and 3 with the read address counter R_CTR_H1/H2 at the read processor 9 to check the presence or absence of a difference therebetween.

Figure 10:
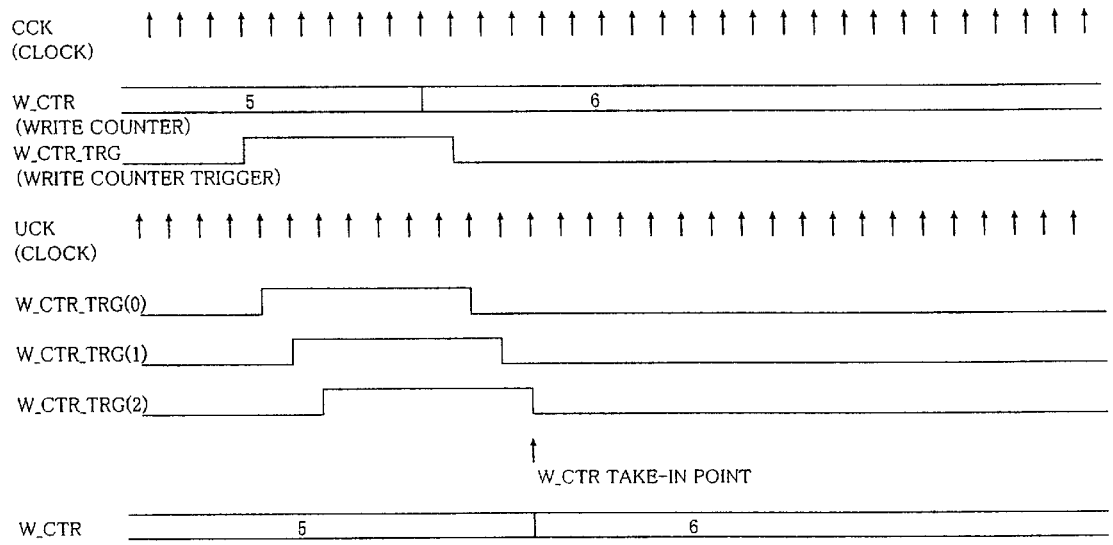
FIG. 10 is a time chart showing a take-in operation of a write processing signal at a read processor used for an ATM cell multiplexer according to the present invention.
Figure 11:
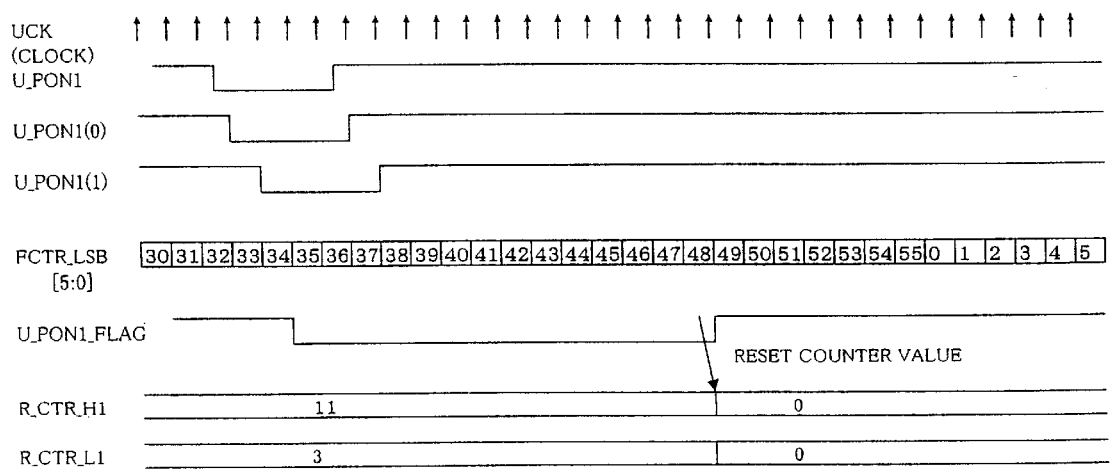
FIG. 11 is a time chart showing a reset operation by a card pulled-out signal at a read processor used for an ATM cell multiplexer according to the present invention.
Figure 12:
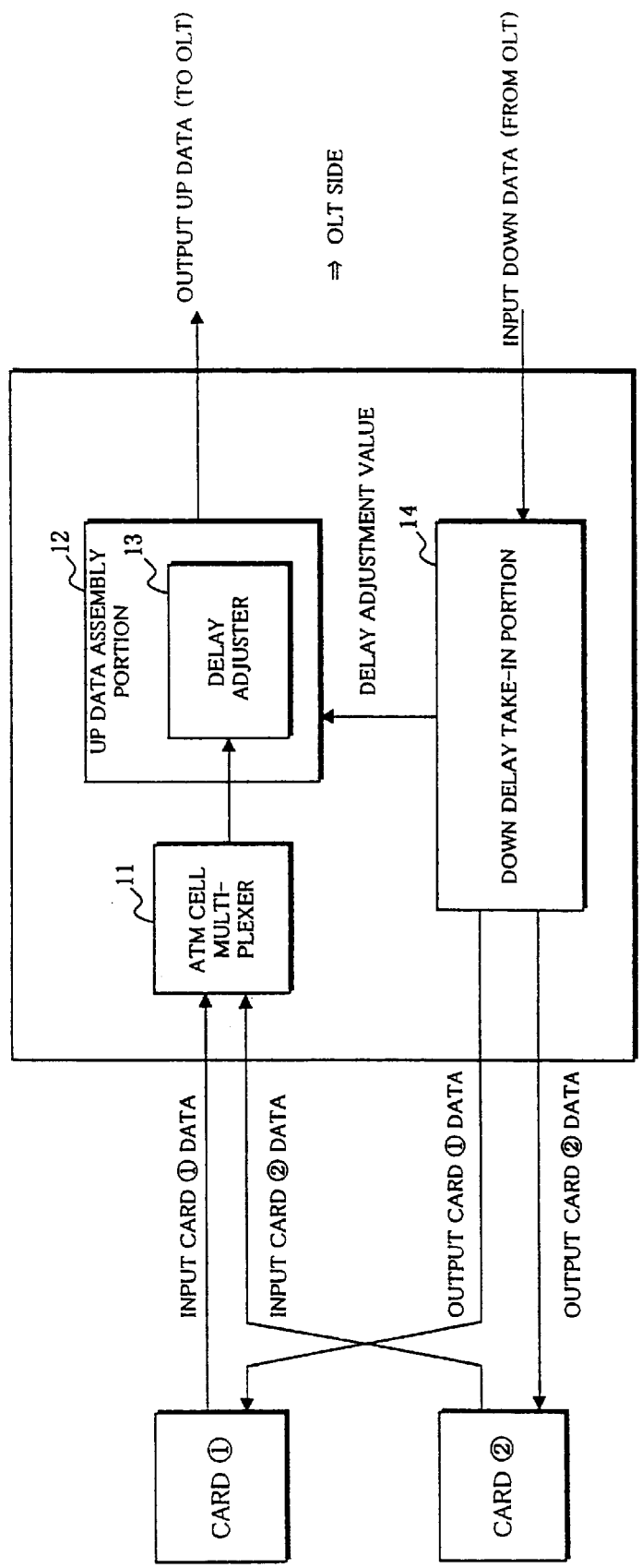
FIG. 12 is a block diagram showing an optical subscriber interface including an ATM cell multiplexer.

Namely, "8" is set as the counter value of the counter W_CTR_H1 for e.g. the FIFO 5 at the write processor 2, and is taken in the read processor 9 by a signal passing through the trigger signal W_CTR_TRG and the protection stages as shown in FIG. 10.

Accordingly, since the count value when the ATM cell is read is held at the position of a read address counter R_CTR_H1 (at step S32) described later in the read processor 9, the count value only has to be compared with the count value of the write address counter W_CTR_H1.

Since the counter R_CTR_H1 is initially "0", there is no coincidence, so that in this case it is found that the high priority cell is written in the FIFO 5 for the card ①. Similarly in the example of FIG. 6A, the high priority cell is written in the FIFO 6, so that the process proceeds from step S26 to step S27.

Figure 8:
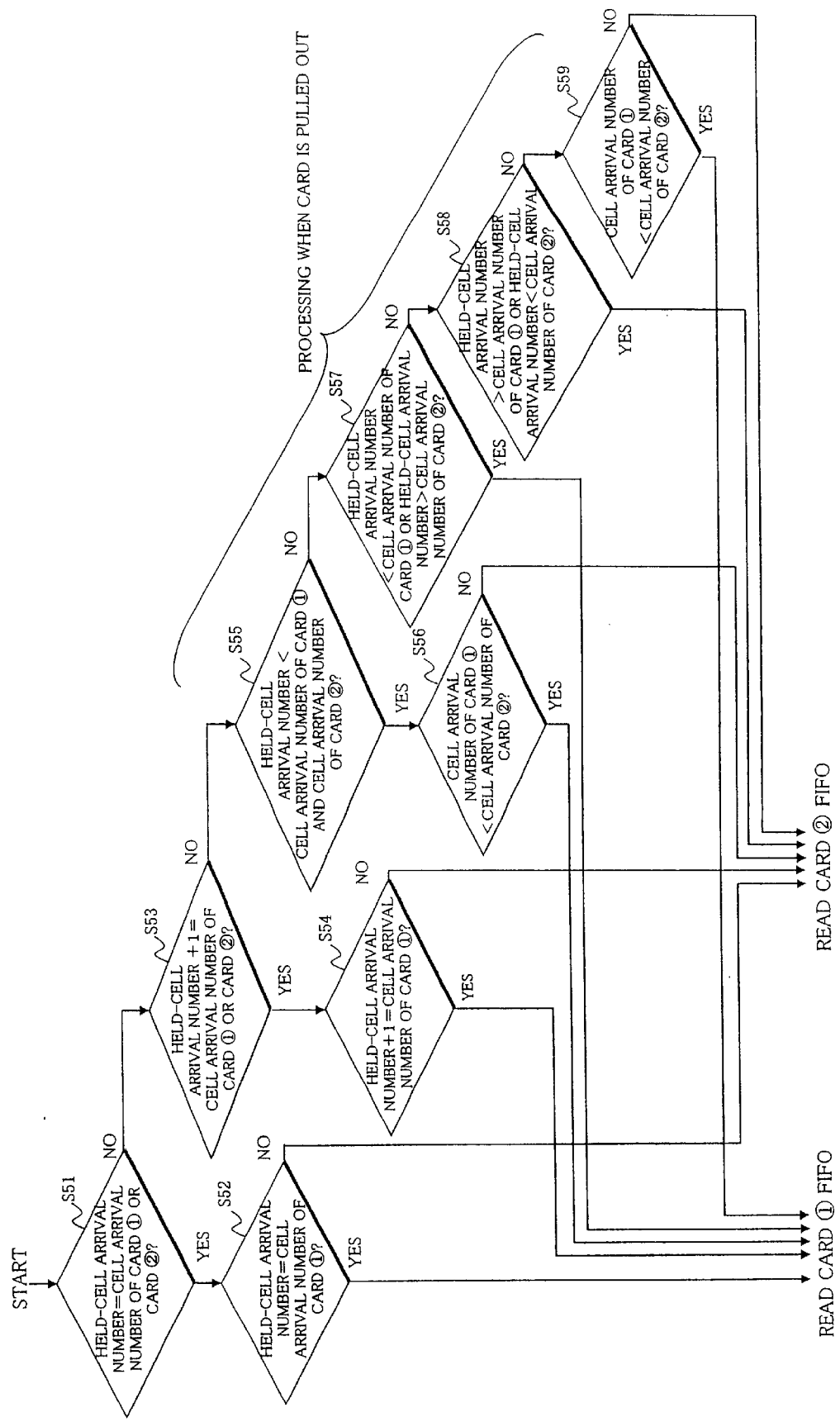
FIG. 8 is a flow chart showing an embodiment of a read-priority processing shown in FIG. 7.

Thus, when the high priority cells are written in both FIFO's 5 and 6, a read-priority processing shown in FIG. 8 is performed (at step S28).

Namely, the read processor 9 holds the latest value (at step S47) of a read-cell arrival number described later, and determines whether or not this held-cell arrival number is equal to the cell arrival numbers added to the ATM cells written in the FIFO's 5 and 6 based on the "0" byte point (position "51" of the frame counter) of the ATM cell shown in FIG. 9 (at step S51).

In this case, since the first held-cell arrival number is an initial value, i.e. "0" and this is coincident with the cell arrival number "0" of the high priority cell written in the address counter value "1" for the FIFO 5 shown in FIG. 6A, the ATM cell at the address "1" for the FIFO 5 is designated by way of step S52.

Namely, if the cell arrival numbers of the cards ① and ② are identical (if the cells simultaneously arrive), it is indicated that the FIFO 5 of the card ① is preferentially read at steps S51 and S52. It is a matter of course that the reverse setting can also be performed.

Thus, the process proceeds to step S30, at which the ATM cell of the cell arrival number "0" in the FIFO 5 is read. If there is no header error in the read ATM cell, which is determined by a parity error signal UPPERR1 shown in FIG. 9, only the address counter R_CTR_H1 is counted up (at steps S31 and S32, and see FIG. 9).

Figure 9:
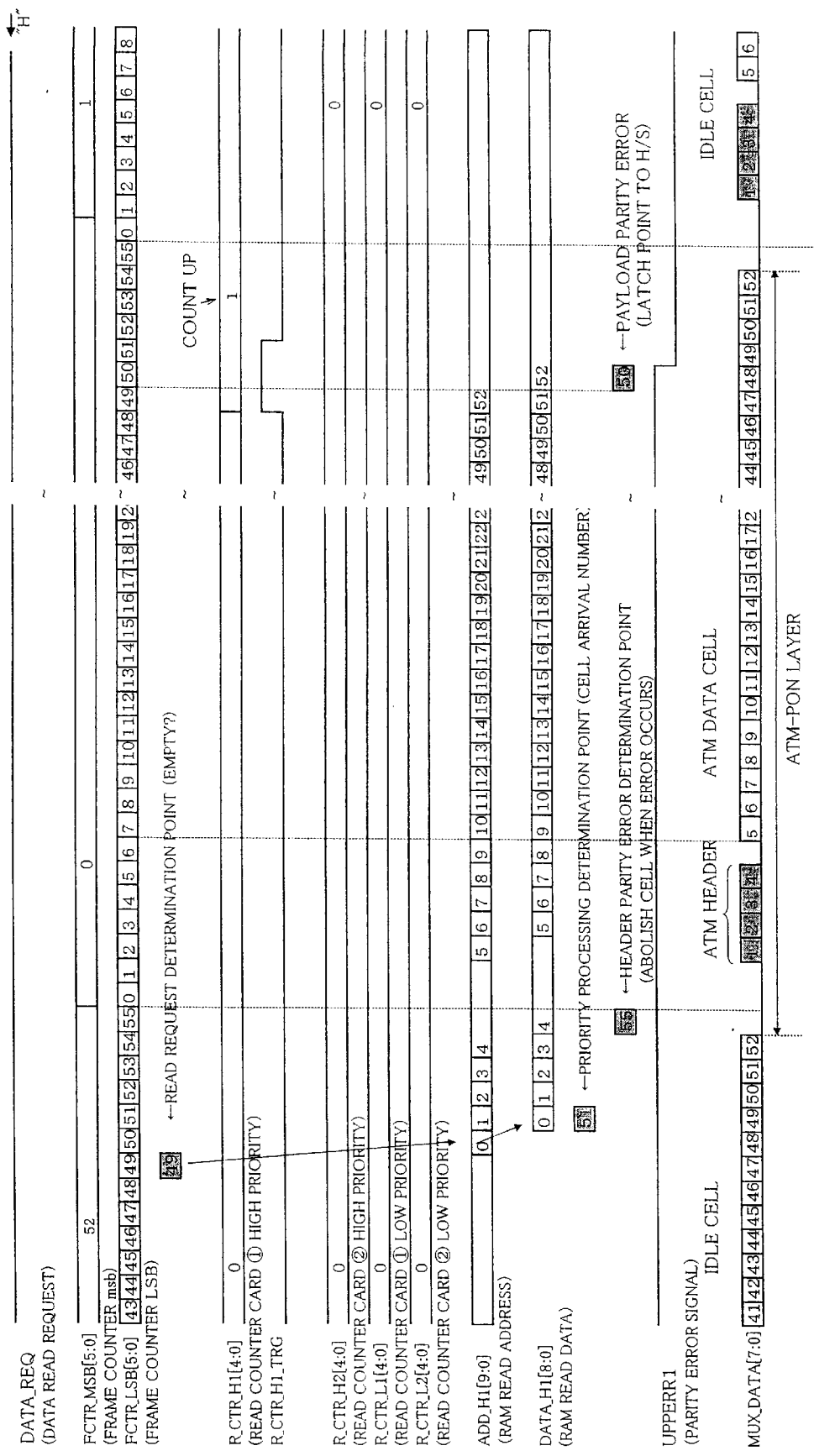
FIG. 9 is a time chart showing an operation of a read processor used for an ATM cell multiplexer according to the present invention.

Information cells are assembled (at step S46), and multiplexing data MUX_DATA are outputted as shown in FIG. 9. The multiplexing data MUX_DATA are outputted in the form in which a mapping on an ATM-PON layer of 56 bytes combined with the ATM header of 4 bytes and the data cell of 49 bytes is performed to the ATM cell of 53 bytes.

At step S47, the arrival number ("0" in the above-mentioned example) of the read ATM cell as mentioned above is held as the latest value.

Thus, after the ATM cell is read, the process returns to step S21. When it is found that the high priority cells are written in both FIFO's 5 and 6 at steps S26 and S27 through steps S22–S25, the process again proceeds to step S28.

Figure 7:
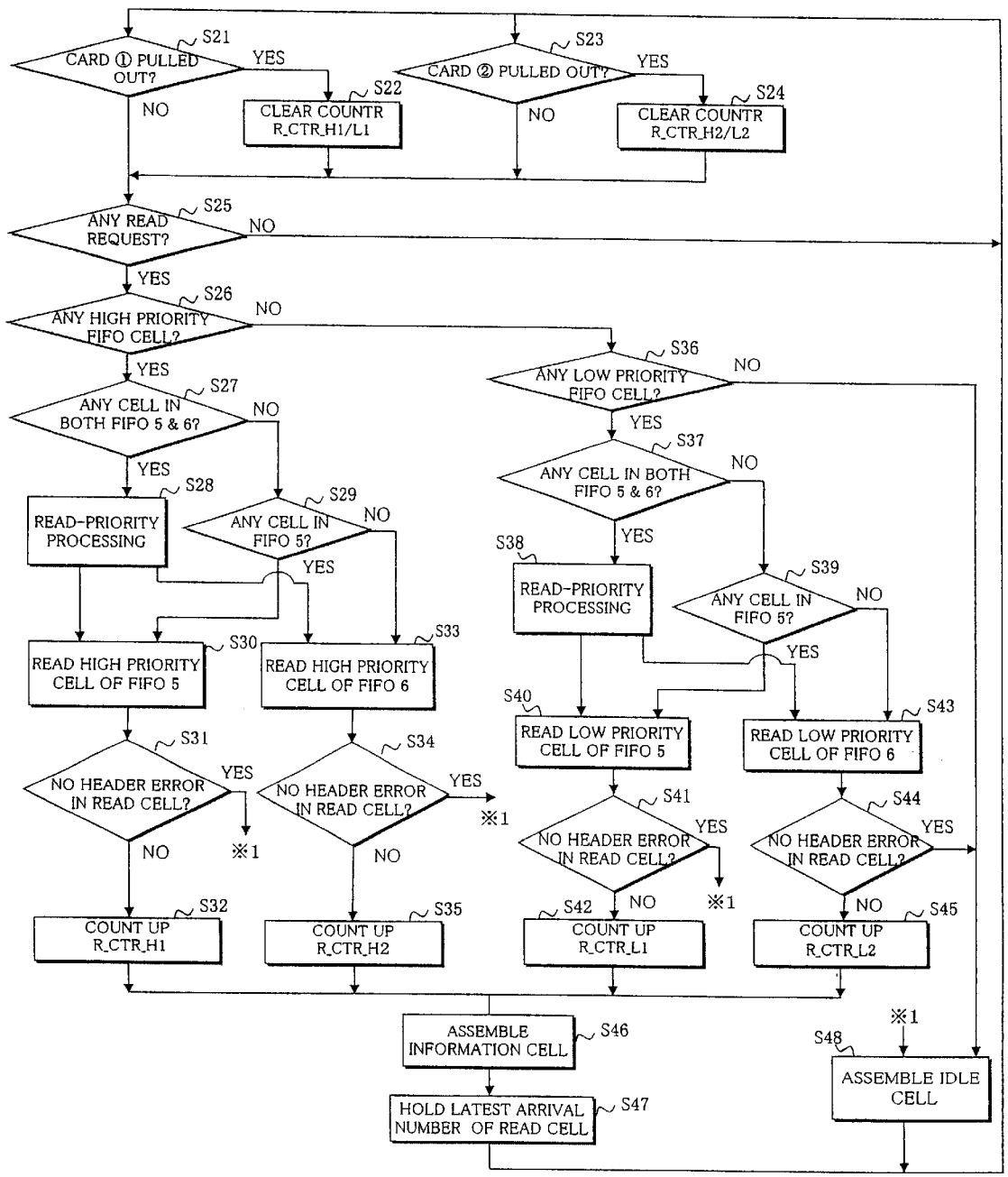
FIG. 7 is a flow chart showing an operation of a read processor used for an ATM cell multiplexer according to the present invention.

Since at step S51 of FIG. 8 again the held-cell arrival number remains "0" which is the latest cell arrival number held at step S47 of FIG. 7, and at step S32 the address counter R_CTR_H1 is counted up, the cell arrival number whose address counter R_CTR_H1 value is equal to or more than "2" becomes an object of the FIFO 5, and the cell arrival number whose address counter R_CTR_H2 value is equal to or more than "1" becomes an object of the FIFO 6. Either value is not coincident with the held-cell arrival number, so that the process proceeds from step S51 to step S53.

At step S53, the held-cell arrival number is incremented by "1" to obtain "1", which is compared with the cell arrival numbers of the FIFO's 5 and 6. As a result, since the address counter R_CTR_H2 of the FIFO 6 is coincident with the cell arrival number "1" indicating "1" in the example of FIG. 6A, the process proceeds to step S33 through step S54, the high priority cell of the FIFO 6 is read (at step S33), and similarly it is confirmed that there is no header error (at step S34). The read address counter R_CTR_H2 is counted up (at step S35), the information cells are assembled (at step S45), and the latest value "1" of the arrival number of the cell which has just been read is held (at step S47).

It is to be noted that at steps S53 and S54 the side of the card ① is set to be preferentially read in the same way as steps S51 and S52.

Thus, the process again proceeds from step S21 to step S28. By repeating the same processing, 15 ATM cells shown in FIG. 6A can be sequentially read according to the cell arrival numbers.

Accordingly, since it is found that there is no high priority cell left from the fact that no difference between both count values of the address counters W_CTR_H and R_CTR_H exists when the process proceeds to step S26, the process proceeds to step S36 to perform the processing for the low priority cell in the same way as the high priority cell.

Also in this case, whether or not there are low priority cells in both FIFO's 7 and 8 is determined (at step S37). If so, the read-priority processing is performed (at step S38) to read the low priority cell of the FIFO 7 or 8 (at steps S40 and S43). After confirming that there is no header error in the respective read cell (at steps S41 and S44), the read address counters R_CTR_L1 and R_CTR_L2 are respectively counted up (at steps S42 and S45), the information cells are assembled (at step S46), and the arrival number of the cell read is held as the latest value (at step S47).

Also when there is a low priority cell in either FIFO 7 or 8, the same process is performed through steps S37–S39.

It is to be noted that in the presence of a header error in the read cell at steps S31, S34, S41, and S44, idle cells are assembled (at step S48).

At the above-mentioned steps S21 and S23, whether or not the card ① or ② is pulled out is determined. In case that the card is pulled out, the address counter (R_CTR_H/L) of the card pulled out is cleared, so that the cell arrival number of the pulled-out-card-side is lost.

As a result, only by watching the sequentiality of the cell arrival number, the read-priority processing of the cell can not be performed when the card is pulled out. Namely, when the cell arrival number is skipped, the processing from steps S55 to S59 is further performed since the oldest cell can not be read firstly at only the steps S51–S54 of FIG. 8 by the read-priority processing in the above-mentioned steps S28 and S38.

Namely, when the card is pulled out, the held-cell arrival number incremented by "1" at step S53 may not be coincident with the cell arrival number of the ATM cell written in the FIFO, so that the ATM cells may not be read.

Therefore, the process proceeds from S53 to step S55. If the high priority cell of FIG. 6A is taken as an example, when the card ① has been already pulled out at the position of the held-cell arrival number "6", the cell arrival number to be written next in the FIFO 5 becomes "16", so that the held-cell arrival number becomes smaller than any arrival number of the FIFO's 5 and 6.

Accordingly, the process proceeds to step S56, at which since the cell arrival number "9" of the FIFO 6 is smaller than the cell arrival number "16" written in the FIFO 5 in this case, the former arrival number "9" is selected as the older cell to be outputted.

Also when the held-cell arrival number is smaller than either cell arrival number of the FIFO 5 or 6, the ATM cell of the cell arrival number of the FIFO in which the held-cell arrival number is smaller compared with this FIFO has only to be outputted (at steps S57 and S58).

When the held-cell arrival number is larger than both cell arrival numbers of the FIFO's 5 and 6, the cell arrival number of the smaller FIFO is selected (at step S59).

Thus, the cell arrival number counter U_CTR_H/L provided for the cell arrival number adding portion 4 in the write processor 1 is required to obtain the counter values equal to or more than the number of the cells as fully occupied×2+2, so that in the example of FIGS. 6A and 6B, counter values equal to or more than "26" are required to be set ("31" is set as the example of 5 bits count in the example of FIGS. 6A and 6B).

Also as an example of step S59, when the card ① is pulled out at the point of the cell arrival number "31" of the FIFO 8 in FIG. 6B, the subsequent arrival number of the ATM cell written in the FIFO 7 is "17". Since the held-cell arrival number becomes larger than both cell arrival numbers of the FIFO's 7 and 8, and the cell arrival number "0" of the FIFO 8 is smaller than the cell arrival number "17" of the FIFO 7, the ATM cell of the cell arrival number "0" in the FIFO 8 is read.

It is to be noted that while the read address counter R_CTR_H/L shown in FIGS. 1 and 9 is provided to the write processor 1, this is for notifying that the FIFO is too fully occupied to be read and stopping the writing of the ATM cells in the FIFO's.

As described above, an ATM cell multiplexer according to the present invention is arranged such that sequential cell arrival numbers common to ATM cells outputted from a plurality of cards are added to each of the cells to be written in memories, and the read side checks a sequentiality of the cell arrival numbers whereby the ATM cells are read in the order of arrival and the cell arrival number at that time is used as the cell arrival number to be checked at the next read time. Therefore, an up-down counter of the number of cells and a controlling memory become unnecessary.

Also, when any of the cards is pulled out, a card not pulled out is operated normally and an address counter of only the card pulled out is cleared. Even when non-sequentiality of the cell arrival numbers due to the clearance of the address counter occurs, the maximum cell arrival number is set to the value which enables the oldest cell to be read first. Therefore, the change of the cell order before and after card-pulling-out-operations does not occur.

Furthermore, by the division of storing memories according to priority degrees, a read control identifying the ATM cells for a real time system as well as those for a data system can be performed.

What we claim is:

1. An ATM cell multiplexer which multiplexes ATM cells outputted from a plurality of cards comprising:

a plurality of memories connected to the cards, a write processor comprises a plurality of write subprocessors, each receiving the ATM cells output from each corresponding card and a cell arrival number adding portion for performing the function of adding sequential cell arrival numbers common to each of the cards to the ATM cells to be written in the memories, and a read processor which reads the cell arrival numbers from the memories to check a sequentiality thereof, thereby reading the ATM cells from the cards in an order of the cell arrival numbers, and which makes the cell arrival numbers at that time the cell arrival numbers to be checked at a next read time.

2. The ATM cell multiplexer as claimed in claim 1 wherein when detecting that the ATM cells from the cards have simultaneously arrived, the write processor adds identical cell arrival numbers to the ATM cells to be written in the memories, and the read processor preferentially reads the ATM cells of a predetermined card from a corresponding memory.

3. The ATM cell multiplexer as claimed in claim 1 wherein the memories are divided into a number corresponding to a priority degree, the write processor detects the priority degree preliminarily added to the ATM cells and adds the cell arrival numbers to the ATM cells according to the priority degree to be written in the corresponding memories, and the read processor reads the ATM cells in the order of the cell arrival numbers from the ATM cells in the memory whose priority degree is high.

4. The ATM cell multiplexer as claimed in claim 3 wherein the write processor has an address counter at a time of writing the ATM cells in the memories, and make the corresponding address counter count up and notify the count value to the read processor when the ATM cells are written in the memories, and the read processor has an address counter at a time of reading corresponding to the former address counter, and makes the corresponding address counter count up and determines whether or not the ATM cells exist in the memories depending on a presence or absence of a difference between the count value notified from the write processor and the count value of the address counter of the read processor when the ATM cells are read from the memories.

5. The ATM cell multiplexer as claimed in claim 4 wherein when receiving a signal indicating that any of the cards is pulled out, the write processor and the read processor clear the address counters of the memories corresponding to the cards to inhibit the writing.

6. The ATM cell multiplexer as claimed in claim 5 wherein the write processor has a counter which counts the cell arrival number up to a count value C described by a formula $$C \geq MXN+2$$

where M denotes a maximum number of the ATM cells to be written in the memories and N denotes the number of the card according to the priority degree.

7. The ATM cell multiplexer as claimed in claim 6 wherein the read processor holds the cell arrival number of the read ATM cell as a latest value to be compared with the cell arrival number added to the ATM cells, firstly reads the ATM cell coincident with an initial value of the latest value, and then reads the ATM cell coincident with the value which is the latest value incremented by "1" from the memories.

8. The ATM cell multiplexer as claimed in claim 6 wherein when there is found no coincident ATM cell, the read processor checks which of the latest value and the cell arrival number of the ATM cells is older, and preferentially reads the ATM cell with a smaller cell arrival number.

9. The ATM cell multiplexer as claimed in claim 1 mapping the ATM cells on an ATM-PON layer.

* * * * *